United States Patent
Fan et al.

(10) Patent No.: US 11,675,895 B2
(45) Date of Patent: Jun. 13, 2023

(54) METHOD AND DEVICE FOR PROCESSING INFORMATION, EQUIPMENT, AND STORAGE MEDIUM

(71) Applicant: BEIJING XIAOMI MOBILE SOFTWARE CO., LTD., Beijing (CN)

(72) Inventors: Lin Fan, Beijing (CN); Tianfu Ren, Beijing (CN); Shuting Tian, Beijing (CN); Xin Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 391 days.

(21) Appl. No.: 16/848,509

(22) Filed: Apr. 14, 2020

(65) Prior Publication Data

US 2021/0064738 A1 Mar. 4, 2021

(30) Foreign Application Priority Data

Aug. 30, 2019 (CN) .......................... 201910817777.X

(51) Int. Cl.
*G06F 21/51* (2013.01)
*G06F 16/245* (2019.01)
(Continued)

(52) U.S. Cl.
CPC .......... *G06F 21/51* (2013.01); *G06F 9/44505* (2013.01); *G06F 16/245* (2019.01);
(Continued)

(58) Field of Classification Search
CPC .... G06F 21/51; G06F 16/245; G06F 9/44505; G06F 8/60–66; G06F 2221/033; G06F 21/6245; G06F 21/6263; G06Q 50/265
(Continued)

(56) References Cited

U.S. PATENT DOCUMENTS 8,135,798 B2 * 3/2012 Welingkar ............ H04L 67/025
709/217
9,292,694 B1 3/2016 Valceanu et al.
(Continued)

FOREIGN PATENT DOCUMENTS

CN 107622200 A 1/2018
CN 108121914 A 6/2018
(Continued)

OTHER PUBLICATIONS

Hauer, Barbara, Data and Information Leakage Prevention Within the Scope of Information Security, IEEE Access (vol. 3), Dec. 2015, 12 pages, [retrieved on Jan. 25, 2023], Retrieved from the Internet: <URL:http://ieeexplore.ieee.org/>.*
(Continued)

*Primary Examiner* — Geoffrey R St Leger
(74) *Attorney, Agent, or Firm* — Arch & Lake LLP

(57) ABSTRACT

A starting instruction directed at a target application (APP) is detected. The starting instruction is adapted to starting the target APP. APP information of the target APP is sent to a server according to the starting instruction. A transmission risk detection result returned by the server according to the APP information is received. The transmission risk detection result indicates whether an operation that transmits data out of a secure region is performed while the target APP is running. The transmission risk detection result is displayed.

4 Claims, 8 Drawing Sheets

(51) Int. Cl.
*G06F 21/55* (2013.01)
*G06Q 50/26* (2012.01)
*G06F 9/445* (2018.01)
*G06F 21/62* (2013.01)
*G06F 8/71* (2018.01)

(52) U.S. Cl.
CPC ........ *G06F 21/552* (2013.01); *G06F 21/6245* (2013.01); *G06F 8/71* (2013.01); *G06F 2221/033* (2013.01); *G06Q 50/265* (2013.01)

(58) Field of Classification Search
USPC ........ 717/168–178, 120–122; 726/22, 23, 25
See application file for complete search history.

(56) References Cited

U.S. PATENT DOCUMENTS

2016/0203320 A1  7/2016  Valceanu et al.
2017/0287032 A1  10/2017  Barday
2018/0174213 A1  6/2018  Barday et al.

FOREIGN PATENT DOCUMENTS

CN  108200073 A  6/2018
CN  108712275 A  10/2018
CN  109240916 A  1/2019

OTHER PUBLICATIONS

Park, Mookyu, et al., Security Risk Measurement for Information Leakage in IoT-Based Smart Homes from a Situational Awareness Perspective, Sensors, 2019, 24 pages, [retrieved on Jan. 25, 2023], Retrieved from the Internet: <URL:https://www.mdpi.com/1424-8220/19/9/2148/>.*
Extended European Search Report in the European Application No. 20171770.9, dated Sep. 23, 2020, (9p).

* cited by examiner

METHOD AND DEVICE FOR PROCESSING INFORMATION, EQUIPMENT, AND STORAGE MEDIUM

CROSS-REFERENCE TO RELATED APPLICATION

This application is based on, and claims benefit of priority to, Chinese Application No. 201910817777.X filed on Aug. 30, 2019. Disclosure of the Chinese Application is hereby incorporated by reference in its entirety.

BACKGROUND

Data security is a major concern in internet industry currently. China and the international community have legislated data security such as user private data security. Hardware data, software data, behavioral data, personal information data, etc., generated when a user uses mobile equipment are all personal private information assets of the user and are information protected by law. Relevant laws and regulations must be followed when it comes to reading, transmitting, storing, and using of personal private information of a user by an APP, to guarantee information security based on a relevant principle.

With popularization of APP use in UE, data transmission security in use of an APP installed in UE has become a major concern.

SUMMARY

According to a first aspect of the present disclosure, a method for processing information may apply to a target User Equipment (UE) terminal. The method may include: detecting a starting instruction directed at a target application (APP), wherein the starting instruction is adapted to start the target APP; sending APP information of the target APP to a server according to the starting instruction; receiving a transmission risk detection result returned by the server according to the APP information, wherein the transmission risk detection result indicates whether an operation that transmits data out of a secure region is performed while the target APP is running; and displaying the transmission risk detection result.

According to a second aspect of the present disclosure, a method for processing information may apply to a server. The method may include: receiving application (APP) information of a target APP sent by a target User Equipment (UE) terminal; acquiring a transmission risk detection result according to the APP information, wherein the transmission risk detection result indicates whether there is a risk that data are transmitted out of a secure region while the target APP is running; and sending the transmission risk detection result to the target UE terminal.

According to a third aspect herein, a User Equipment (UE) terminal may include a one or more processors and a non-transitory computer-readable memory. The non-transitory computer-readable memory is adapted to storing an instruction executable by the one or more processors. The one or more processors are adapted to detect a starting instruction directed at a target application (APP), wherein the starting instruction is adapted to starting the target APP; send APP information of the target APP to a server according to the starting instruction; receive a transmission risk detection result returned by the server according to the APP information, wherein the transmission risk detection result indicates whether an operation that transmits data out of a secure region is performed while the target APP is running; and instruct the UE terminal to display the transmission risk detection result on the UE terminal.

According to a fourth aspect herein, a server may include a processor and a non-transitory computer-readable memory. The non-transitory computer-readable memory is adapted to store an instruction executable by the processor. The processor is adapted to receive application (APP) information of a target APP sent by a target User Equipment (UE) terminal; acquire a transmission risk detection result according to the APP information, wherein the transmission risk detection result indicates whether there is a risk that data are transmitted out of a secure region while the target APP is running; and send the transmission risk detection result to the target UE terminal.

The above general description and the detailed description below are only exemplary and explanatory, and do not limit the subject disclosure.

BRIEF DESCRIPTION OF THE ACCOMPANYING DRAWINGS

Drawings here are incorporated in and constitute part of the subject disclosure, illustrate examples according to the subject disclosure, and together with the subject disclosure, serve to explain the principle of the subject disclosure.

DETAILED DESCRIPTION

Figure 1:
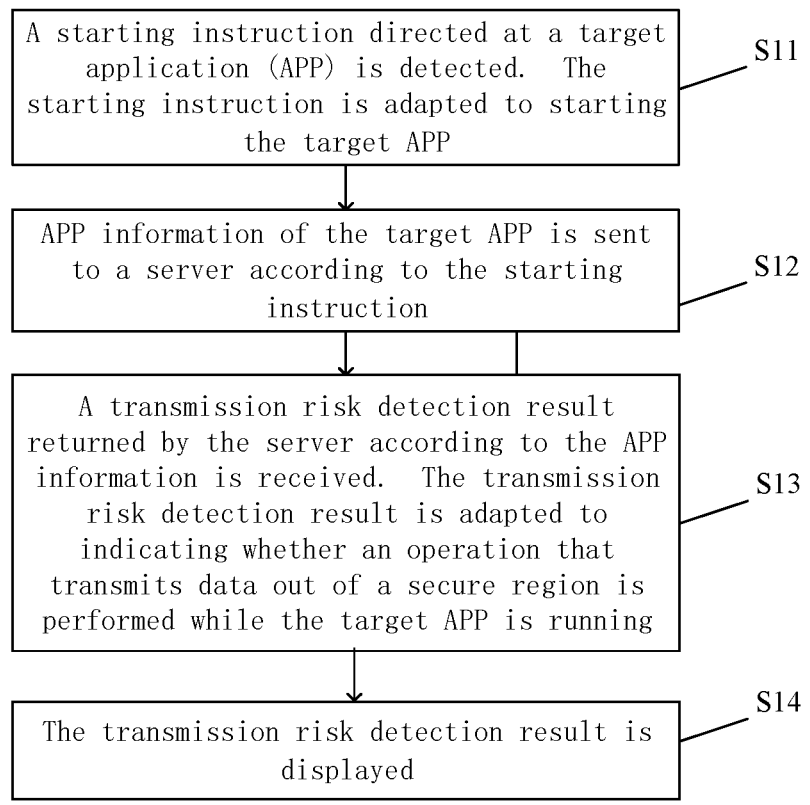
FIG. 1 is a flowchart of a method for processing information according to an example herein.

Examples of the present disclosure (illustrated in the accompanying drawings) are elaborated below. The following description refers to the accompanying drawings, in which identical or similar elements in two drawings are denoted by identical reference numerals unless indicated otherwise. Implementations set forth in the following examples do not identify all implementations in accordance with the subject disclosure. Rather, they are mere examples of the device and method in accordance with certain aspects of the subject disclosure as recited in the accompanying claims. The exemplary implementation modes may take on multiple forms, and should not be taken as being limited to examples illustrated herein. Instead, by providing such implementation modes, examples herein may become more comprehensive and complete, and comprehensive concept of the exemplary implementation modes may be delivered to those skilled in the art.

A term used in an example herein is merely for describing the example instead of limiting the subject disclosure. A singular form "a" and "the" used in an example herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an example herein to describe various kinds of information, such information should not be limited to such a term. Such a term is merely for distinguishing information of one type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art will know that the technical solutions of examples herein may be carried out without one or more of the details; alternatively, another method, component, device, option, etc., may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

FIG. 1 is a flowchart of a method for processing information according to an example herein. The method may apply to target UE. As shown in FIG. 1, the method for processing information applying to the target UE may include an option as follows.

In S11, a starting instruction directed at a target application (APP) is detected. The starting instruction is adapted to start the target APP.

In S12, APP information of the target APP is sent to a server according to the starting instruction.

In S13, a transmission risk detection result returned by the server according to the APP information is received. The transmission risk detection result indicates whether an operation that transmits data out of a secure region is performed while the target APP is running.

In S14, the transmission risk detection result is displayed.

According to an example herein, UE may include mobile UE and fixed UE. Mobile UE may include a mobile phone, a tablet computer, wearable equipment, etc. Fixed UE may include, but is not limited to, a Personal Computer (PC).

Target UE may refer to UE used by a user. An APP may be installed in target UE. A user may operate an APP installed in target UE. For example, a user may start a target APP. Accordingly, in S11, target UE may detect a starting instruction directed at a target APP.

In S12, after detecting a starting instruction, target UE may send APP information of a target APP to a server. APP information of a target APP may include at least an APP name of the target APP and/or run data generated by the target APP at runtime. Run data may include information on a server supporting running of the target APP. APP information may further include information such as information on a version of a target APP, a data volume of a packet of the target APP, information on a developer of the target APP, time when the target APP was developed, etc.

According to an example herein, APP information may include at least an APP identifier of a target APP. An APP identifier may include, but is not limited to, at least one of an APP name or an APP number.

An APP identifier may serve as a unique identifier of an APP. Therefore, after a target UE sends an APP identifier of a target APP to a server, the server may determine, based on information on the unique identifier, whether there is a risk that the target APP transmits data out of a secure region.

According to an example herein, in addition to a unique identifier of a target APP, APP information may further include information on a version of the target APP.

With examples herein, an APP name as well as information on a version of a target APP may be sent, facilitating locating of a target APP of a specific version number by a server, improving precision of a server in detecting a transmission risk associated with a target APP in target UE.

According to an example herein, a target UE may not send APP information every time a user starts a target APP. S12 may include an option as follows.

After receiving a first starting instruction directed at a target APP after installation of the target APP, target UE may send APP information of the target APP to a server.

With examples herein, target UE may send APP information of a target APP to a server only after receiving a first starting instruction directed at the target APP after installation of the target APP, so as to acquire and display a transmission risk detection result returned by the server. It may be understood that in this mode, user awareness and perception of data transmission security may be improved while also taking into account user experience and power consumption of target UE.

According to an example herein, after receiving a first starting instruction directed at a target APP after update of the target APP, target UE may send APP information of the target APP to a server.

According to an example herein, a privacy security managing circuit may be arranged in target UE. When a privacy security managing circuit is in an activated state, after receiving a first starting instruction directed at a target APP after installation or update of the target APP, target UE may send APP information of the target APP to a server.

With examples herein, a privacy security managing circuit in target UE may be adapted to manage any APP installed in the target UE. Namely, after a user activates a risky transmission alert through the module, APP information of any APP in target UE may be sent to a server when the any APP is started for the first time.

After sending APP information of a target APP to a server, target UE may receive an indication returned by the server according to the APP information. The indication may indicate whether an operation that transmits data out of a secure region is performed while the target APP is running.

A secure region may be a range set as needed by a user. For example, a secure region associated with privacy security involving transnational data transmission, i.e., cross-border data transmission, may be a country owning a location corresponding to a network used by UE running a target APP.

As another example, UE intended to be used by people of a special occupation may be allowed to transmit data only within a specific region. For example, aerospace and or aviation personnel, although may transmit data within a work zone of theirs, may not transmit data out of the work zone.

According to an example herein, data may include data generated during use of a target APP. Data may include data involving personal privacy of a user borne during data transmission. After receiving a transmission risk detection result, target UE may display the transmission risk detection result on a screen of the target UE to alert a user. For example, a transmission risk detection result may be displayed as a pop-up.

It may be understood that with examples herein, after detecting a starting instruction directed at a target APP, target UE may send APP information of the target APP to a server. The target UE may receive a transmission risk detection result sent by the server. The target UE may display the transmission risk detection result on the UE, thereby improving awareness and perception of a user using the target UE of data transmission security.

Figure 2:
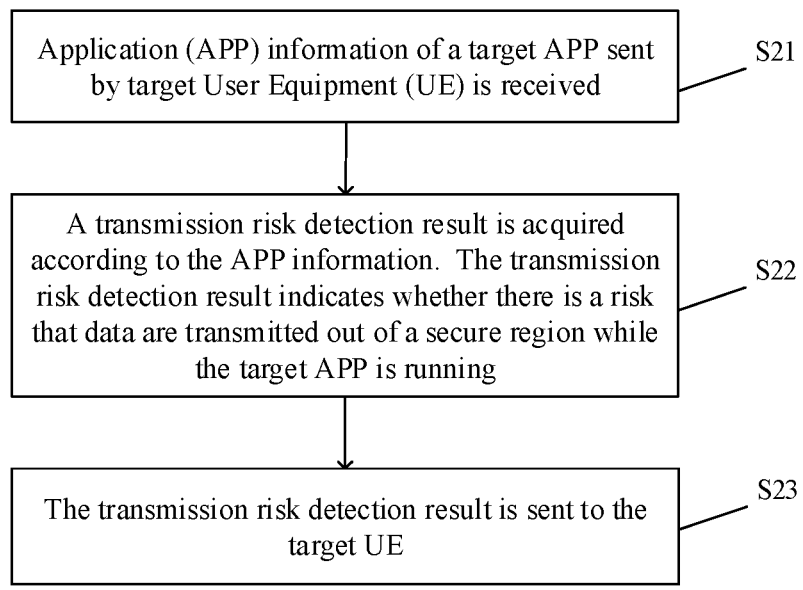
FIG. 2 is a flowchart of a method for processing information according to an example herein.

FIG. 2 is a flowchart of a method for processing information according to an example herein. The method may apply to a server. As shown in FIG. 2, the method for processing information applying to the server may include an option as follows.

In S21, application (APP) information of a target APP sent by target User Equipment (UE) is received.

In S22, a transmission risk detection result is acquired according to the APP information. The transmission risk detection result indicates whether there is a risk that data are transmitted out of a secure region while the target APP is running.

In S23, the transmission risk detection result is sent to the target UE.

According to an example herein, a server may communicate with a target UE. A server may receive APP information of a target APP sent by target UE. The server may acquire a transmission risk detection result associated with the target APP according to the APP information.

According to an example herein, S22 may include an option as follows.

A search result may be acquired by searching a risk database according to the APP information.

When the search result indicates that the risk database contains the APP information, the transmission risk detection result may be acquired according to the search result. The transmission risk detection result may indicate whether data are transmitted out of the secure region while the target APP is running.

With examples herein, a risk database of a server may store privacy risk detection data associated respectively with multiple APPs. Privacy risk detection data associated with an APP may be stored in form of a privacy risk report. A privacy risk report may include private data borne by an APP, whether the APP may transmit data out of a secure region, whether the APP performs encrypted data transmission, etc. Privacy risk detection data associated with numerous APPs stored in a server may form a system of big data of privacy risks associated respectively with APPs.

A server may search a risk database according to APP information such as an APP name and information on a version number of a target APP. When an APP name and information on a version number of a target APP is found, a server may learn, according to the search result, whether an APP may transmit data out of a secure region. Namely, a server may acquire a transmission risk detection result indicating whether data are transmitted out of a secure region while a target APP is running.

It may be learned whether an APP may transmit data out of a secure region according to a transmission risk identifier corresponding to APP information in a risk database. A transmission risk identifier may be adapted to identify whether an APP may transmit data out of a secure region.

After acquiring, from a risk database, information on whether an APP may transmit data out of a secure region, a server may process the information to form a transmission risk detection result output in a preset format and return the transmission risk detection result to target UE.

According to an example herein, a risk database may not store privacy risk detection data associated with a target APP. Therefore, according to an example herein, S22 may include an option as follows.

When a search result indicates that a risk database does not contain APP information, a server may run a target APP on test UE.

A server may generate a transmission risk detection result according to a running result of running a target APP on test UE. The running result may indicate whether data are transmitted out of a secure region while the target APP is running.

With examples herein, when a server fails to find an APP name and information on a version number of a target APP in a risk database, the server may run the target APP using test UE and generate a transmission risk detection result according to a running result of the run in the test UE.

Alternatively, according to an example herein, when a server does find, in a risk database, an APP name and information on a version number of a target APP, however with a transmission risk identifier corresponding to the private data being null, the server may run the target APP using test UE and generate a transmission risk detection result according to a running result of the run in the test UE.

According to an example herein, to run a target APP using test UE, a server may have to install the target APP in the test UE first. A server may download a run file of a target APP according to received APP information, such as an APP name and information on a version number, of the target APP. The server may install the run file on test UE through an automatic test platform such as a jenkins platform.

After a run file of a target APP is installed on test UE through a jenkins platform, the test UE may be controlled by the jenkins platform. The test UE may call a written test case through the jenkins platform to run a Monkey test program, to test how a target APP runs. A server may generate a transmission risk detection result according to a running result of running a target APP on test UE. The running result may indicate whether data are transmitted out of a secure region while the target APP is running.

A Monkey test may also be referred to as a trick test, where a tested system is generally used with an irregular instruction or operation in order to observe stability and fault tolerance of the system. According to an example herein, a tested system may refer to a system supporting running of a target APP.

According to an example herein, test UE and target UE may be the same UE. Test UE may differ from target UE.

According to an example herein, after generating a transmission risk detection result, a server may establish a correspondence between APP information and a transmission risk identifier in a risk database according to the transmission risk detection result generated.

With examples herein, a server may acquire a transmission risk detection result using test UE only when a risk database does not contain APP information of a target APP. After acquiring the transmission risk detection result using the test UE, the server may add a correspondence between the APP information of the target APP and a transmission risk identifier in a risk database. Accordingly, the transmission risk detection result may be returned quickly to another user using the target APP.

According to an example herein, a server may generate a transmission risk detection result according to a running result of whether data are transmitted out of a secure region while a target APP runs on test UE, as follows.

A server may acquire, according to log data indicating a running result, a first location of a server supporting running of a target APP.

The server may acquire a determination result by determining whether the first location is outside a secure region.

The server may generate a transmission risk detection result according to the determination result.

According to an example herein, after running a target APP using test UE, a server may generate, at a jenkins platform, log data indicating a running result. Log data may include a Hyper Text Transfer Protocol (HTTP) request packet, private data read and transmitted by a target APP, etc. A server may acquire a first location of a server supporting running of a target APP based on an HTTP request packet in log data generated by a jenkins platform.

A server may to acquire a first Internet Protocol (IP) address corresponding to a domain name borne in an HTTP request packet by analyzing the HTTP request packet. The server may acquire a first location of a server supporting running of a target APP indicated by the first IP address by searching a predetermined IP library for the first IP address.

After acquiring a first location of a server supporting running of a target APP, a server may determine whether the first location is outside a secure region. The server may generate a transmission risk detection result according to the determination result. If the first location is outside the secure region, the transmission risk detection result generated may indicate a security risk associated with running the target APP. Otherwise if the first location is inside the secure region, the transmission risk detection result generated may indicate no security risk associated with running the target APP.

Exemplarily, for cross-border transmission, if a second location of test UE is in a country A, while a first location of a server supporting running of a target APP is in a country B, it means that an operation that transmits data out of a secure region may be performed while the target APP is running and that there is a transmission risk associated with the target APP.

According to an example herein, a server may determine a secure region according to test UE as follows. A server may acquire a second location of test UE. The server may determine a secure region according to the second location.

With examples herein, a target APP may be run in test UE. A second location of test UE may be an address where data take place. A secure region may be determined through an address where data take place. A server may acquire a second IP address corresponding to a network used by test UE. The server may search a predetermined IP library for a second location corresponding to the second IP address. After acquiring the second location, the server may determine a secure region according to a standard for determining a private data transmission risk.

A predetermined IP library may store geographical locations of different IP addresses. Accordingly, with examples herein, the first location may be acquired based on the first IP address. The second location may be acquired based on the second IP address.

It may be understood that with examples herein, after receiving APP information of a target APP sent by target UE, a server may acquire a transmission risk detection result according to the APP information. The transmission risk detection result may indicate whether there is a risk that data are transmitted out of a secure region while the target APP is running. The server may send the transmission risk detection result to the target UE. Accordingly, the target UE may display the transmission risk detection result before a user, improving user awareness and perception of security in data transmission.

Figure 3:
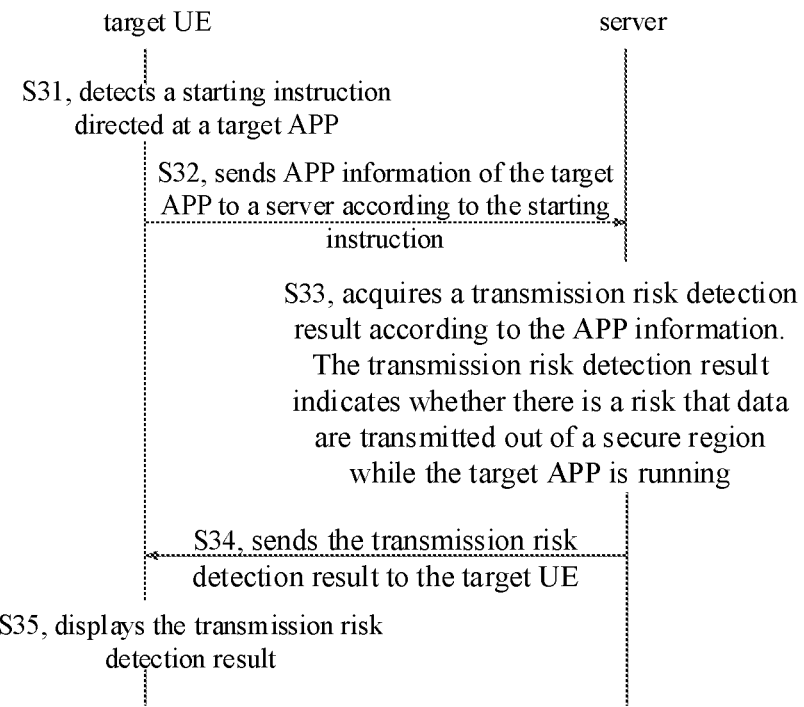
FIG. 3 is a flowchart of interaction of a method for processing information according to an example herein.

FIG. 3 is a flowchart of interaction of a method for processing information according to an example herein. As shown in FIG. 3, the method for processing information may apply to target UE and a server. The method may include an option as follows.

In S31, target UE detects a starting instruction directed at a target APP.

In S32, the target UE sends APP information of the target APP to a server according to the starting instruction.

In S33, the server acquires a transmission risk detection result according to the APP information. The transmission risk detection result indicates whether there is a risk that data are transmitted out of a secure region while the target APP is running.

According to an example herein, S33 may include an option as follows. A server may acquire, based on a risk database stored at the server, a transmission risk detection result indicating whether there is a risk that data are transmitted out of a secure region while a target APP is running. A server may acquire a transmission risk detection result based on test UE. Test UE and target UE may be the same UE. Test UE may differ from target UE.

In S34, the server sends the transmission risk detection result to the target UE.

In S35, the target UE displays the transmission risk detection result.

With examples herein, through interaction between target UE and a server, when a target APP is started, the target UE may display, before a user, a transmission risk detection result associated with the target APP, to alert the user, improving user awareness and perception of security in data transmission.

Figure 4:
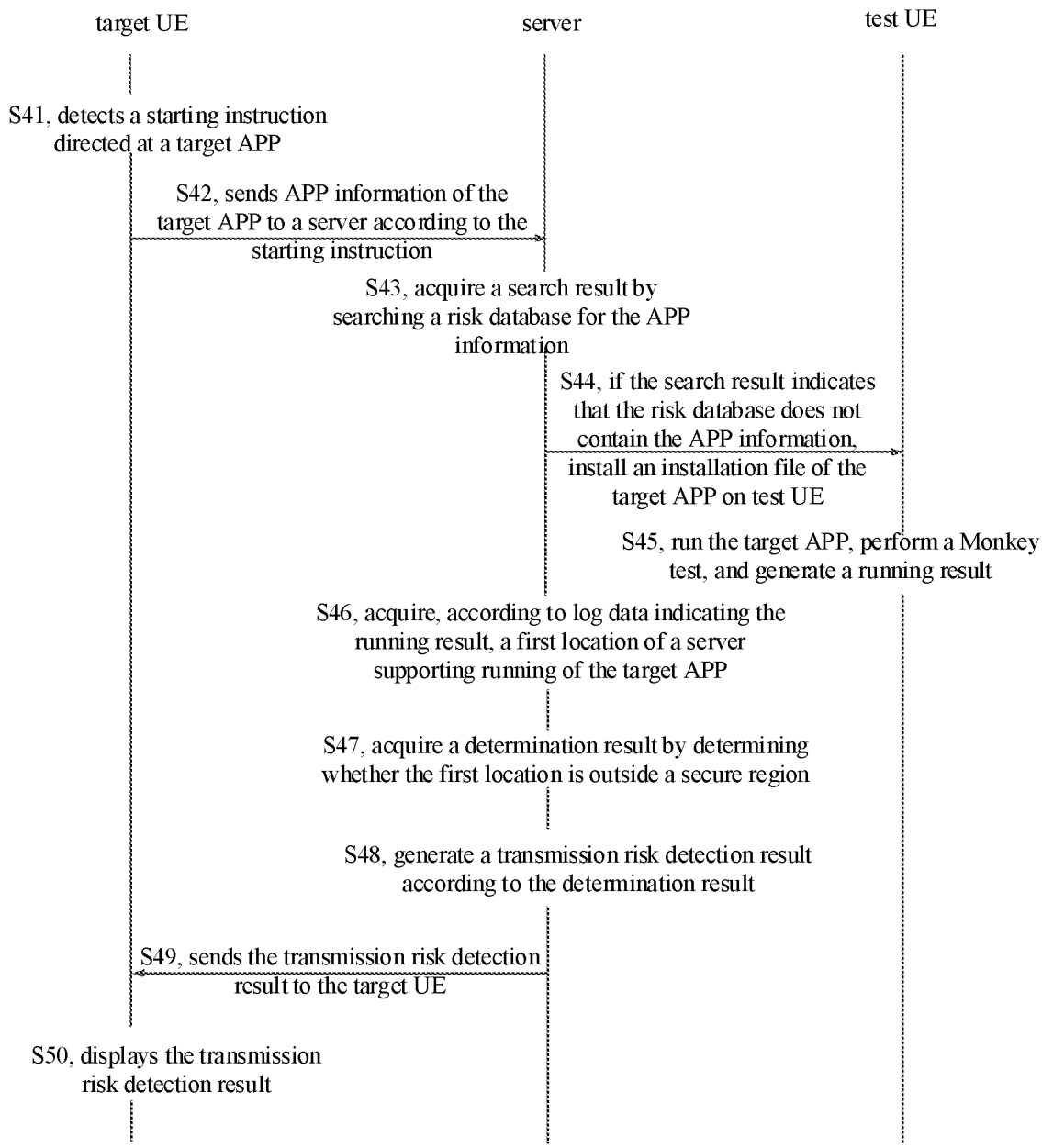
FIG. 4 is a flowchart of interaction of a method for processing information according to an example herein.

FIG. 4 is a flowchart of interaction of a method for processing information according to an example herein. As shown in FIG. 4, the method for processing information may apply to target UE, a server, and test UE. The method may include an option as follows.

In S41, target UE detects a starting instruction directed at a target APP.

In S42, the target UE sends APP information of the target APP to a server according to the starting instruction.

In S43, the server may acquire a search result by searching a risk database for the APP information.

In S44, if the search result indicates that the risk database does not contain the APP information, the server may install an installation file of the target APP on test UE.

In S45, the test UE may run the target APP, perform a Monkey test, and generate a running result.

In S46, the server may acquire, according to log data indicating the running result, a first location of a server supporting running of the target APP.

In S47, the server may acquire a determination result by determining whether the first location is outside a secure region.

In S48, the server may generate a transmission risk detection result according to the determination result.

In S49, the server sends the transmission risk detection result to the target UE.

In S50, the target UE displays the transmission risk detection result.

With examples herein, through interaction between a server and test UE, when no APP information of a target APP may be found in a risk database of a server, a transmission risk detection result may be acquired by running the target APP on test UE. Accordingly, when the target APP is started on target UE, the target UE may display, before a user, the transmission risk detection result associated with the target APP, to alert the user, improving user awareness and perception of security in data transmission.

Figure 5:
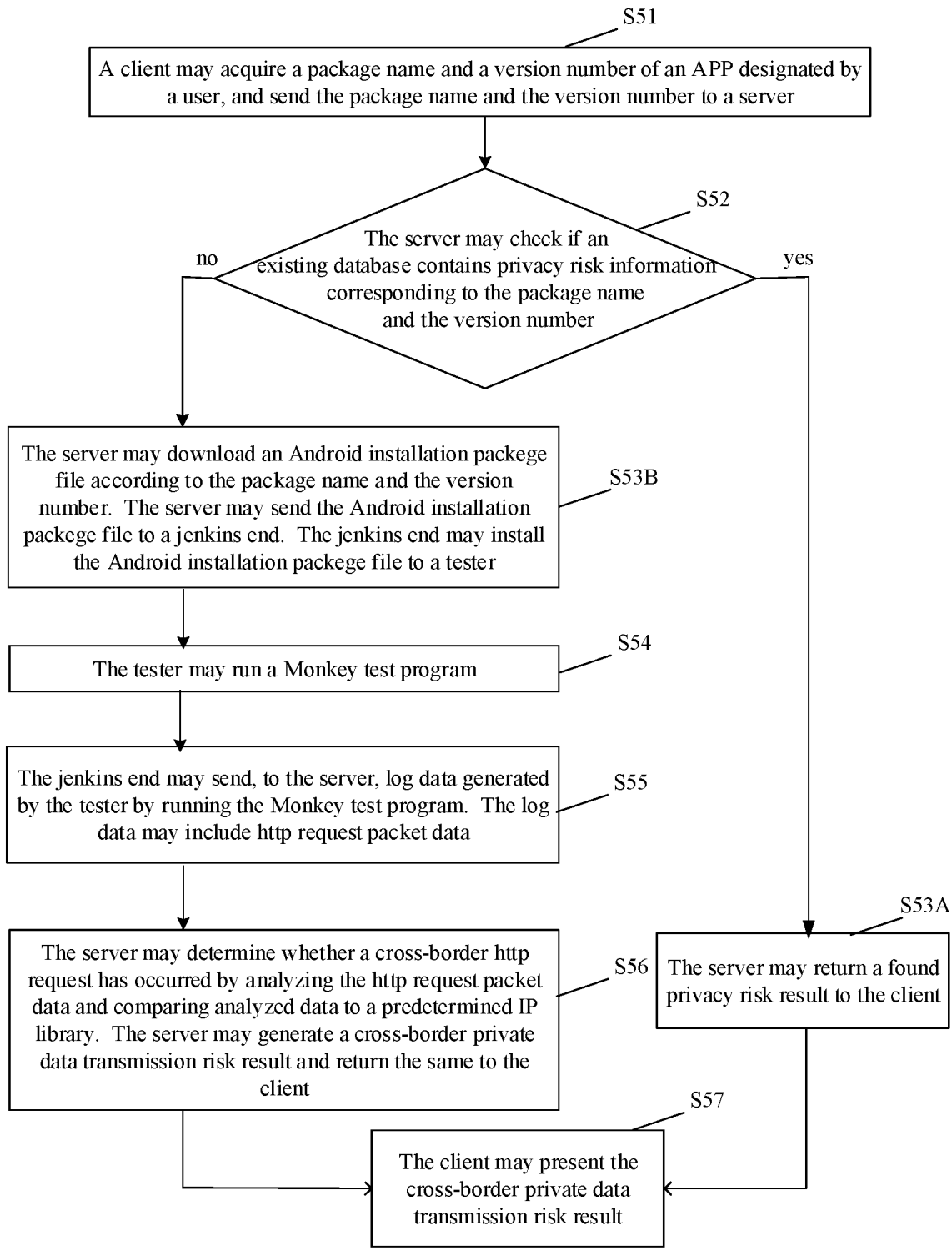
FIG. 5 is a diagram of an example of a method for processing information according to an example herein.

As the internet market of China opens gradually, an increasing number of Chinese internet companies are going out of China to the world. An increasing number of foreign companies are entering the China market. Cross-border transmission of private data has become a major concern in privacy security and protection. As an example, detection of a cross-border transmission risk associated with an APP in an Android platform is described below. FIG. 5 is a diagram of an example of a method for processing information according to an example herein. Based on the method for processing information in FIG. 3 and FIG. 4, as shown in FIG. 5, the method may include an option as follows.

In S51, a client may acquire a package name and a version number of an APP designated by a user, and send the package name and the version number to a server.

According to an embodiment herein, a client may be an operating end running in target UE. An operating end may be operated by a user. A package name and a version number of an APP designated by a user may be APP information of a target APP.

A client may transmit APP information of a target APP to a server, i.e., a background server.

In S52, the server may check if an existing database contains privacy risk information corresponding to the package name and the version number. If it does, the flow may go to S53A and S57. Otherwise if it does not, the flow may go to S53B.

With examples herein, an existing database may refer to a risk database. By the server checking if an existing database contains privacy risk information corresponding to the package name and the version number, it means that a background server may search for a privacy risk result associated with a target APP.

In S53A, the server may return a found privacy risk result to the client.

According to an example herein, a privacy risk result found by a server may be a cross-border private data transmission risk result. A cross-border private data transmission risk result may be a transmission risk detection result according to an example herein.

In S53B, the server may download an Android installation package file according to the package name and the version number. The server may send the Android installation package file to a jenkins end. The jenkins end may install the Android installation package file to a tester. S54 may be performed through the tester.

According to an example herein, a jenkins end may refer to a test platform deployment of which is supported by a server. Such a test platform may serve to perform a function such as automatic test.

In S54, the tester may run a Monkey test program.

According to an example herein, data generated when a target APP runs, i.e., running result data, may be acquired by running the target APP in a tester, i.e., test UE, and performing a Monkey test on the target APP.

In S55, the jenkins end may send, to the server, log data generated by the tester by running the Monkey test program. The log data may include HTTP request packet data.

According to an example herein, after a jenkins test platform executes a Monkey test program through test UE, log data may be generated in the jenkins test platform. The log data may indicate running result data of running a target APP. The log data may include private data read and/or transmitted by the target APP at runtime. The private data may involve personal privacy of a user. The log data may include HTTP request packet data generated by the target APP at runtime.

A jenkins end may send log data to a server. That is, a jenkins test platform may send log data to a background server.

In S56, the server may determine whether a cross-border http request has occurred by analyzing the http request packet data and comparing analyzed data to a predetermined IP library. The server may generate a cross-border private data transmission risk result. The server may return the cross-border private data transmission risk result to the client.

According to an example herein, the server may acquire a first location of a server supporting running of a target APP by searching a predetermined IP library for a first IP address corresponding to a domain name borne in an HTTP request packet.

When a jenkins test platform executes a Monkey test program through test UE, a background server may learn a second IP address corresponding to a network used by the test UE, and search a predetermined IP library for a second location of the test UE.

A privacy risk result indicating whether there is a cross-border transmission risk may be generated by determining whether the first location and the second location are in one country. The privacy risk result may be sent to the client.

In S57, the client may present the cross-border private data transmission risk result.

According to an example herein, cross-border transmission risk data may be acquired through a database of a server storing big data of privacy risks. Alternatively, an HTTP request packet of a target APP at runtime may be acquired by performing, by a test platform supported by a server, a Monkey test using test UE. Accordingly, the server may determine whether there is a cross-border transmission risk associated with the target APP. An alert may be provide to a client according to a cross-border transmission risk result found in a database or a cross-border transmission risk result acquired by a server using a test at test UE, improving awareness of security and protection and user perception of a risk of cross-border transmission of personal private data by a target APP.

Figure 6:
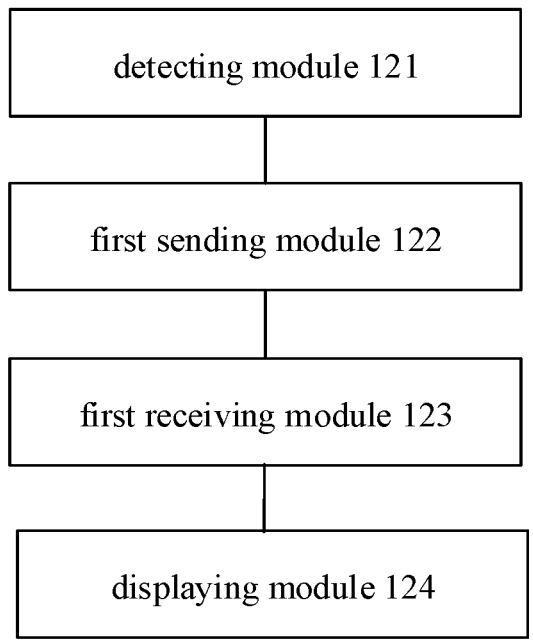
FIG. 6 is a diagram of a setup of UE according to an example herein.

FIG. 6 is a diagram of a setup of target UE according to an example herein. Referring to FIG. 6, target User Equipment (UE) may include a detecting module 121, a first sending module 122, a first receiving module 123, and a displaying module 124.

The detecting module 121 is adapted to detect a starting instruction directed at a target application (APP). The starting instruction is adapted to start the target APP.

The first sending module 122 is adapted to send APP information of the target APP to a server according to the starting instruction.

The first receiving module 123 is adapted to receive a transmission risk detection result returned by the server according to the APP information. The transmission risk detection result is adapted to indicate whether an operation that transmits data out of a secure region is performed while the target APP is running.

The displaying module 124 is adapted to display the transmission risk detection result.

According to an example herein, the first sending module 122 may be adapted to, in response to receiving a first starting instruction directed at the target APP after installation of the target APP, send the APP information of the target APP to the server. The first sending module may be adapted to, in response to receiving a first starting instruction directed at the target APP after update of the target APP, send the APP information of the target APP to the server.

According to an example herein, the first sending module 122 may be adapted to, in response to a privacy security managing circuit being in an activated state, in response to receiving a first starting instruction directed at the target APP after installation or update of the target APP, send the APP information of the target APP to the server.

According to an example herein, the APP information may include at least an APP identifier of the target APP. The APP identifier may include at least one of an APP name or an APP number.

According to an example herein, the APP information may further include information on a version of the target APP.

Figure 7:
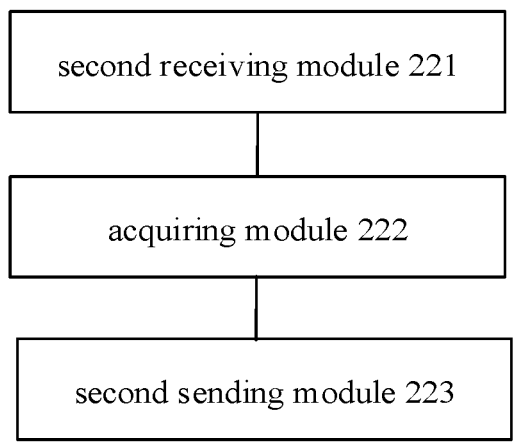
FIG. 7 is a diagram of a setup of a server according to an example herein.

FIG. 7 is a diagram of a setup of a server according to an example herein. Referring to FIG. 7, a server may include a second receiving module 221, an acquiring module 222, and a second sending module 223.

The second receiving module 221 is adapted to receive application (APP) information of a target APP sent by target User Equipment (UE).

The acquiring module 222 is adapted to acquire a transmission risk detection result according to the APP information. The transmission risk detection result indicates whether there is a risk that data are transmitted out of a secure region while the target APP is running.

The second sending module 223 is adapted to send the transmission risk detection result to the target UE.

According to an example herein, the acquiring module 222 may be adapted to: acquire a search result by searching a risk database according to the APP information; and in response to the search result indicating that the risk database contains the APP information, acquiring, according to the search result, the transmission risk detection result indicating whether data are transmitted out of the secure region while the target APP is running.

According to an example herein, the acquiring module 222 may be adapted to, in response to the search result indicating that the risk database does not contain the APP information, run the target APP on test UE; and generate the transmission risk detection result according to a running result of running the target APP on the test UE. The running result may indicate whether data are transmitted out of the secure region while the target APP is running.

According to an example herein, the server may further include an establishing module.

The establishing module 224 may be adapted to establish a correspondence between the APP information and a transmission risk identifier in the risk database according to the transmission risk detection result generated.

According to an example herein, the acquiring module 222 may be adapted to, acquire, according to log data indicating the running result, a first location of a server supporting running of the target APP; acquiring a determination result by determining whether the first location is outside the secure region; and generating the transmission risk detection result according to the determination result.

According to an example herein, the server may further include a determining module.

The determining module 225 may be adapted to: acquire a second location of the test UE; and determining the secure region according to the second location.

A module of the device according to at least one example herein as shown in FIG. 6 and FIG. 7 may execute an operation in a mode elaborated in at least one example of the method herein, which will not be repeated here.

According to an example herein, User Equipment (UE) includes a one or more processors and first memory.

The first memory is adapted to store an instruction executable by the one or more processors.

The one or more processors are adapted to:

detect a starting instruction directed at a target application (APP), the starting instruction being adapted to start the target APP;

send APP information of the target APP to a server according to the starting instruction;

receive a transmission risk detection result returned by the server according to the APP information, the transmission risk detection result being adapted to indicate whether an operation that transmits data out of a secure region is performed while the target APP is running; and instruct the UE terminal to display the transmission risk detection result on the UE terminal.

Figure 8:
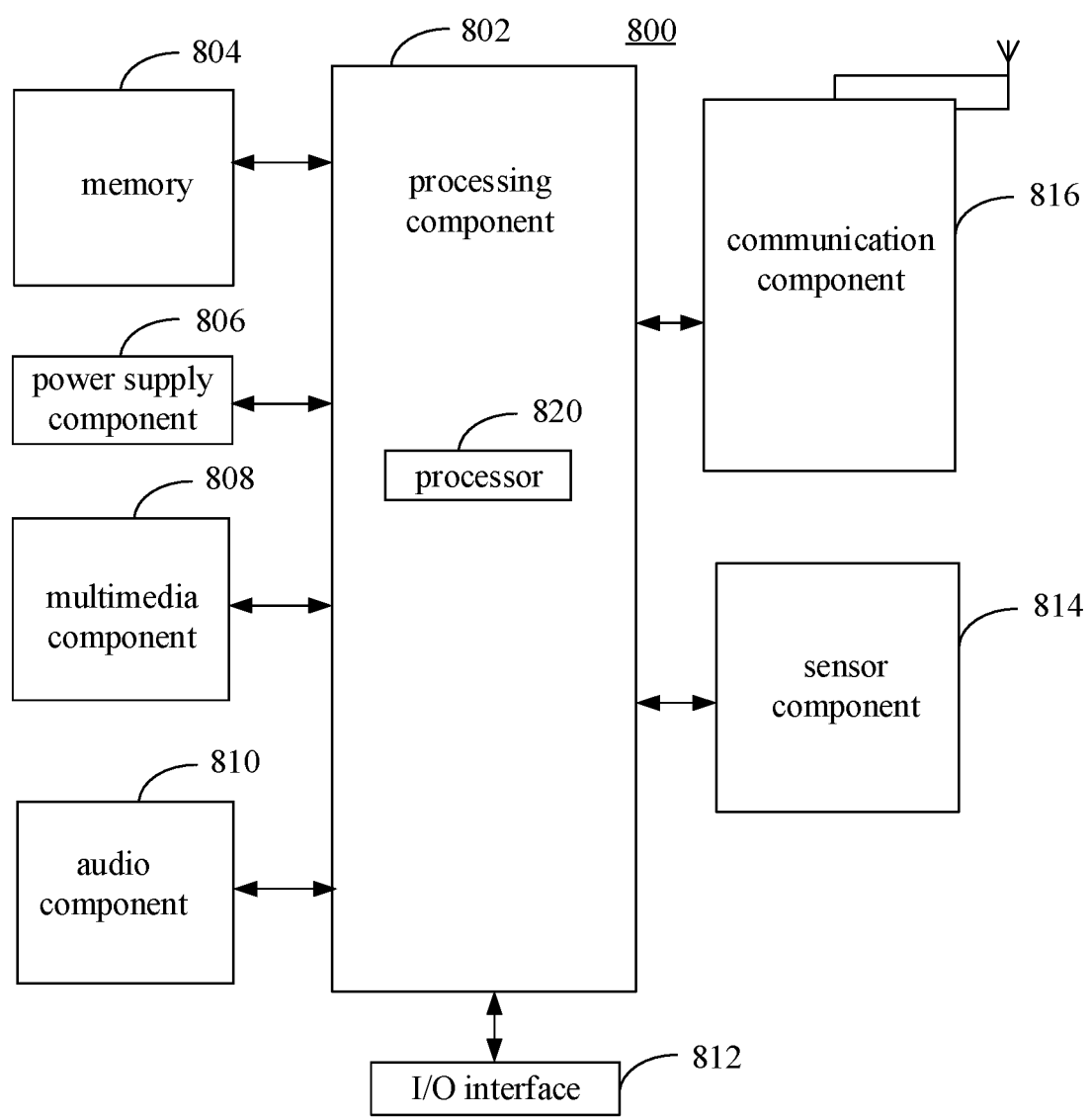
FIG. 8 is a block diagram of UE according to an example herein.

FIG. 8 is a block diagram of UE 800 according to an exemplary example. For example, the UE 800 may be a mobile phone, a mobile computer, etc.

Referring to FIG. 8, the UE 800 may include at least one of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the UE 800, such as operations associated with display, a telephone call, data communication, a camera operation, a recording operation, etc. The processing component 802 may include one or more processors 820 to execute instructions so as to complete all or a part of an aforementioned method. In addition, the processing component 802 may include one or more modules to facilitate interaction between the processing component 802 and other components. For example, the processing component 802 may include a multimedia portion to facilitate interaction between the multimedia component 808 and the processing component 802.

The memory 804 may be adapted to store various types of data to support the operation at the UE 800. Examples of such data may include instructions of any application or method adapted to operate on the UE 800, contact data, phonebook data, messages, pictures, videos, etc. The memory 804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 806 may supply electric power to various components of the UE 800. The power supply component 806 may include a power management system, one or more power sources, and other components related to generating, managing, and distributing electricity for the UE 800.

The multimedia component 808 may include a screen that provides an output interface between the UE 800 and a user. In some examples, the screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. In some examples, the multimedia component 808 may include at least one of a front camera or a rear camera. When the UE 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be adapted to output and/or input an audio signal. For example, the audio component 810 may include a microphone (MIC). When the UE 800 is in an operation mode such as a call mode, a recording mode, a voice recognition mode, etc., the MIC may be adapted to receive an external audio signal. The received audio signal may be further stored in the memory 804 or may be sent via the communication component 816. In some examples, the audio component 810 may further include a loudspeaker adapted to output the audio signal.

The I/O interface 812 may provide an interface between the processing component 802 and a peripheral interface portion. Such a peripheral interface portion may be a keypad, a click wheel, a button, etc. Such a button may include but is not limited to at least one of a homepage button, a volume button, a start button, or a lock button.

The sensor component 814 may include one or more sensors for assessing various states of the UE 800. For example, the sensor component 814 may detect an on/off state of the UE 800 and relative positioning of components such as the display and the keypad of the UE 800. The sensor component 814 may further detect a change in the position of the UE 800 or of a component of the UE 800, whether there is contact between the UE 800 and a user, the orientation or acceleration/deceleration of the UE 800, a change in the temperature of the UE 800, etc. The sensor component 814 may include a proximity sensor adapted to detect existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, etc.

The communication component 816 may be adapted to facilitate wired or wireless communication between the UE 800 and other equipment. The UE 800 may access a wireless network based on a communication standard such as Wi-Fi, 2G, 3G . . . , or a combination thereof. In an example of the present disclosure, the communication component 816 may broadcast related information or receive a broadcast signal from an external broadcast management system via a broadcast channel. In an example of the present disclosure, the communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an example, the UE 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement an aforementioned method.

According to an example, a non-transitory computer-readable storage medium including instructions, such as memory 804 including instructions, may be provided. The instructions may be executed by the processor 820 of the UE 800 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc. In an example, the UE 800 may be implemented by one or more Application Specific Integrated Circuits (ASICs), Digital Signal Processors (DSPs), Digital Signal Processing Equipment (DSPDs), Programmable Logic Equipment (PLDs), Field Programmable Gate Arrays (FPGAs), controllers, micro-controllers, microprocessors or other electronic components, and is adapted to execute the abovementioned method.

A non-transitory computer-readable storage medium has stored thereon instructions which, when executed by a processor of User Equipment (UE), allow the UE to execute a method for processing information. The method includes:

detecting a starting instruction directed at a target application (APP), the starting instruction being adapted to start the target APP;

sending APP information of the target APP to a server according to the starting instruction;

receiving a transmission risk detection result returned by the server according to the APP information, the transmission risk detection result being adapted to indicate whether an operation that transmits data out of a secure region is performed while the target APP is running; and displaying the transmission risk detection result.

According to an example herein, a server includes a second processor and second memory.

The second memory is adapted to store an instruction executable by the second processor.

The second processor is adapted to: receive application (APP) information of a target APP sent by target User Equipment (UE); acquire a transmission risk detection result according to the APP information, the transmission risk detection result indicating whether there is a risk that data are transmitted out of a secure region while the target APP is running; and send the transmission risk detection result to the target UE.

Figure 9:
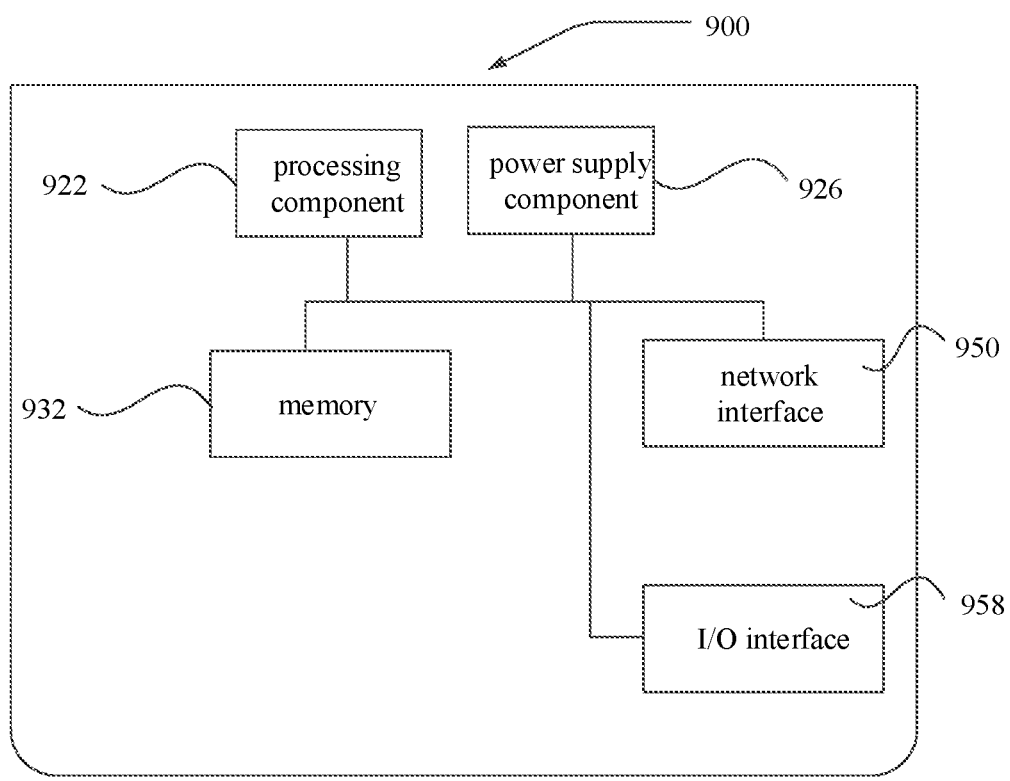
FIG. 9 is a block diagram of a server according to an example herein.

FIG. 9 is a block diagram of a server 900 according to an example. Referring to FIG. 9, the server 900 may include a processing component 922. The processing component may include one or more processors. The server may include a memory resource represented by memory 932. The memory may be adapted to store an instruction executable by the processing component 922, such as an APP. The APP stored in the memory 932 may include one or more modules. Each of the modules may correspond to a group of instructions. In addition, the processing component 922 may be adapted to execute instructions to perform the method for processing information herein.

The server 900 may further include a power supply component 926. The power supply component may be adapted to manage power of the server 900. The server may further include a wired or wireless network interface 950 adapted to connect the server 900 to a network. The server may further include an Input/Output (I/O) interface 958. The server 900 may operate based on an operating system stored in the memory 932, such as a Windows Server™, a Mac OS X™, a Unix™, a Linux™, a FreeBSD™, etc.

According to an example herein, a non-transitory computer-readable storage medium including instructions, such as the memory 932 including instructions, may be provided. The instructions may be executed by the processing component 922 of the server 900 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

A non-transitory computer-readable storage medium has stored thereon instructions which, when executed by a processing component of a server, allow the server to execute a method for processing information. The method includes:

receiving application (APP) information of a target APP sent by target User Equipment (UE);

acquiring a transmission risk detection result according to the APP information, the transmission risk detection result indicating whether there is a risk that data are transmitted out of a secure region while the target APP is running; and sending the transmission risk detection result to the target UE.

A device example herein basically corresponds to a method example herein, description of which may be referred to for a related part thereof. A device example described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand and implement the above without creative effort.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the examples are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. A method for processing information, the method comprising:

receiving, by a server, application (APP) information of a target APP sent by a User Equipment (UE) terminal;

acquiring, by the server, a search result by searching a risk database for the APP information;

in response to the search result indicating that the risk database does not contain the APP information, acquiring, by the server, a running result by running the target APP on a test UE terminal, wherein the running result indicates whether data are transmitted out of a secure region while the target APP is running;

generating, by the server, a transmission risk detection result according to the running result, wherein the transmission risk detection result indicates whether there is a risk that the data are transmitted out of the secure region while the target APP is running; and sending, by the server, the transmission risk detection result to the UE terminal.

2. The method of claim 1, further comprising:

establishing, by the server, a correspondence between the APP information and a transmission risk identifier in the risk database according to the transmission risk detection result generated.

3. The method of claim 1, wherein generating the transmission risk detection result according to the running result of running the target APP on the test UE terminal comprises:

acquiring, according to log data indicating the running result, a first location of another server supporting running of the target APP;

acquiring a determination result by determining whether the first location is outside of the secure region; and generating, by the server, the transmission risk detection result according to the determination result.

4. The method of claim 3, further comprising:

acquiring, by the server, a second location of the test UE terminal; and determining, by the server, the secure region according to the second location.

* * * * *